United States Patent [19]

Brancolini

[11] 4,275,608

[45] Jun. 30, 1981

[54] GEARBOX FOR AN AGRICULTURAL TRACTOR

[75] Inventor: Emiliano Brancolini, Sorbara, Italy

[73] Assignee: Fiat Trattori S.p.A., Modena, Italy

[21] Appl. No.: 66,141

[22] Filed: Aug. 13, 1979

[30] Foreign Application Priority Data

Nov. 28, 1978 [IT] Italy .............................. 69717 A/78

[51] Int. Cl.³ ............................................ F16H 37/00
[52] U.S. Cl. ............................. 74/15.63; 74/665 GA; 74/740; 74/783
[58] Field of Search ..................... 74/15.63, 15.66, 740, 74/645, 665 GA, 781 R, 782, 783; 192/3.52, 3.53

[56] References Cited

U.S. PATENT DOCUMENTS

| | | | |
|---|---|---|---|
| 2,776,572 | 1/1957 | Walter | 74/15.63 |
| 2,800,803 | 7/1957 | Bechman et al. | 74/15.63 X |
| 2,871,726 | 2/1959 | Kamlukin | 74/740 X |
| 2,923,176 | 2/1960 | Randt | 74/740 |
| 3,357,276 | 12/1967 | Vavulo et al. | 74/740 |
| 3,722,301 | 3/1973 | Crooks | 74/15.63 |

*Primary Examiner*—G. J. Husar
*Assistant Examiner*—Moshe I. Cohen
*Attorney, Agent, or Firm*—Sughrue, Rothwell, Mion, Zinn and Macpeak

[57] ABSTRACT

A speed change gearbox for agricultural tractors and similar vehicles has an elongate casing rotatably mounting input and output shafts which are coupled by gearing comprising reduction means selectively operable to provide one of a plurality of reduction ratios, and a final gearing stage which serves to set a particular range of ratios. The reduction means includes an epicyclic gear mechanism provided with associated hydraulic control means for selectively controlling movement of various of its elements, and pairs of continuously meshing gears operatively selectable by further hydraulic control means. The arrangement of the hydraulic control means is such that they are all centered on the input shaft which enables the transverse bulk of the gearbox to be minimized.

3 Claims, 4 Drawing Figures

GEARBOX FOR AN AGRICULTURAL TRACTOR

The present invention relates to vehicle gearboxes and in particular relates to a gearbox suitable for agricultural tractors and similar vehicles, which provides a high number of selectable gear ratios and comprises a casing of elongate form, an input shaft rotatably mounted in the casing and extending longitudinally therethrough to project from opposite ends of the casing, the projecting end portions of the input shaft respectively receiving drive from an engine of the vehicle and constituting a power take off, an output shaft rotatably mounted in the casing parallel to the input shaft and projecting from the casing at the end corresponding to the power take off, reduction means drivable by said input shaft and selectively operable to provide one of a plurality of reduction ratios, and a final mechanical gear stage serving to establish a connection between the reduction means and the output shaft, the final stage being selectively operable to set one of a plurality of forward gearing ratio ranges or at least one reverse gearing range with the actual reduction ratio through the gearbox in the selected range being dependent on the selected ratio of said reduction means.

Gearboxes of the above form are generally all mechanical with both the final stage and the reduction means being constituted by reduction gear units of similar form, that is, comprising a pair of parallel shafts selectively interconnectable by pairs of continuously meshing gears.

The housing of such all - mechanical gearboxes in casings of elongate form makes them particularly suitable for installations in agricultural tractors and similar vehicles since the gearbox can be used as a "backbone" between an internal combustion engine mounted in the front part of the vehicle, and the back axle.

On the other hand, gearboxes provided with hydraulic clutches offer certain advantages over the all-mechanical type. In particular, hydraulic clutch gearboxes allow a very smooth and gradual transfer between the various ratios of the gearbox independently of the manner in which the operator has effected the gear shift manoeuvre, and in addition make it possible to dispense with the use of a conventional friction clutch since its function is performed by the hydraulic clutches.

Existing hydraulic clutch gearboxes have, however, the disadvantage of presenting a large transverse bulk, due to the presence of a multiplicity of parallel shafts. As a result, such gearboxes are generally unsuitable for installation in the long narrow space allotted for a gearbox in an agricultural tractor or similar vehicle.

It is therefore an object of the present invention to provide a gearbox which will occupy an elongate casing such as used for a conventional all - mechanical gearbox but which includes hydraulic clutches.

This object is achieved in accordance with the invention by forming said reduction means of the gearbox with first and second mechanical reduction stages interconnected in series with each other by a hollow transmission shaft which surrounds a portion of said input shaft, the first stage being constituted by an epicyclic gear mechanism which coaxially surrounds the input shaft and the transmission shaft and includes a crown wheel fast for rotation with the input shaft, a planet carrier fast for rotation with the transmission shaft and selectively connectable with the input shaft by means of a hydraulically controlled friction clutch, and a sun wheel selectively lockable with respect to the casing by means of a hydraulically controlled friction brake, the second stage being constituted by at least two pairs of continuously meshing gears, disposed physically between the first stage and the final stage, and each comprising a driven gear wheel keyed on an input drive shaft of the final stage and a driving gear wheel which coaxially surrounds the transmission shaft, the driving gear wheels being selectively connectable to the transmission shaft by means of respective hydraulically controlled friction clutches which surround the transmission shaft.

The final stage of the gearbox is the same as a conventional mechanical gearbox in as much as range selection is only effected with the vehicle being stationary. On the other hand, the first and the second stages which constitute the ratio reduction gearing and which are intended to be operated with the vehicle in motion have the advantages described above of gearboxes with hydraulic clutches. Due to the three friction clutches and the friction brake all being centred on the input shaft, the first and second stages constituting the reduction means can be given a narrow and elongate form enabling them to be fitted into the same type of casing as a completely mechanical gearbox.

The four ratios of the first and second stages can be combined in pairs, by means of a suitable distributor controlling the hydraulic clutches and brake, in such a way as to obtain four selectable reduction ratios between the input shaft and the drive shaft which constitutes the input shaft of the final stage. If the final stage includes three forward gear ranges plus one reverse gear range, the gearbox thus formed will provide a total of twelve forward gear ratios plus four reverse gear ratios.

A gearbox embodying the invention will now be particularly described, by way of example, with reference to the accompanying diagrammatic drawings, in which.

Figure 1:
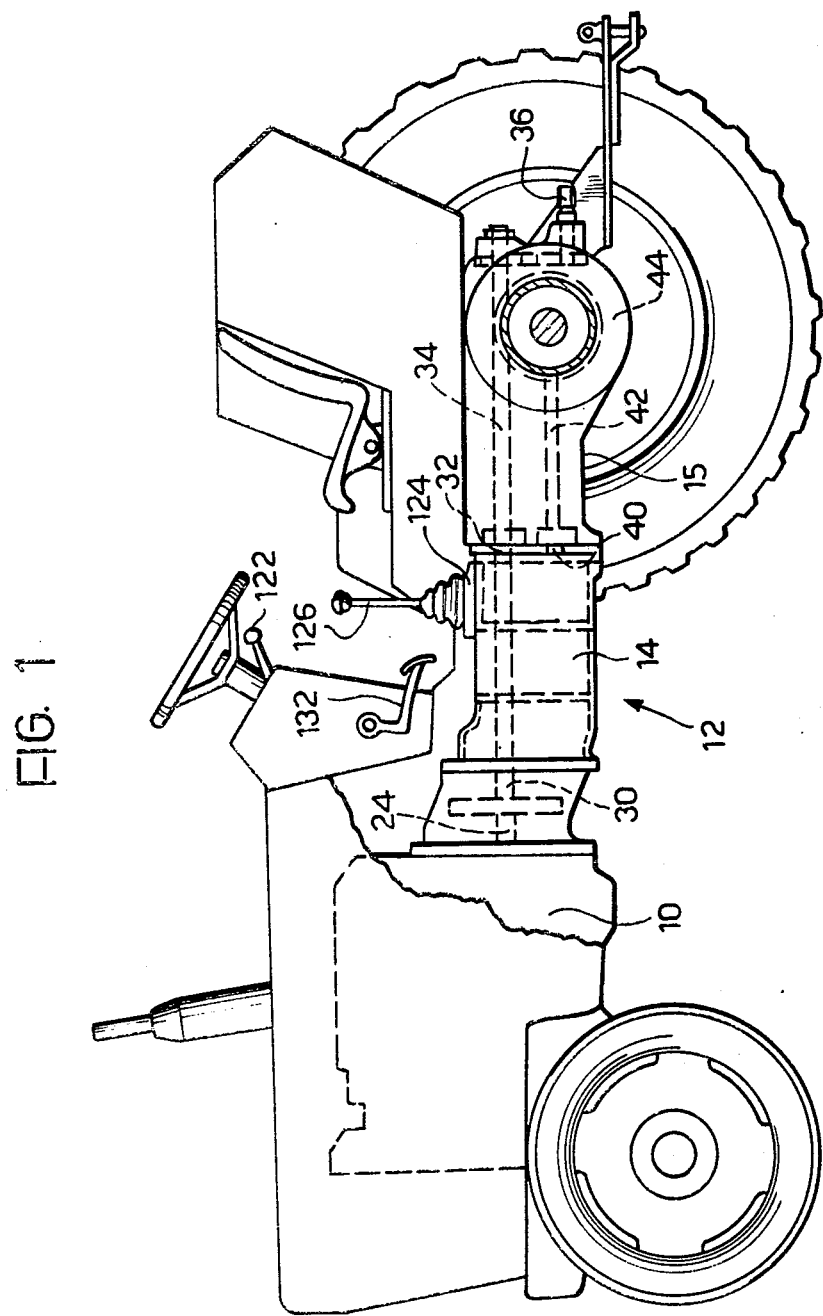
FIG. 1 is a schematic side elevation of an agricultural tractor incorporating the gearbox.

As shown in FIG. 1, an agricultural tractor is provided with an internal combustion engine 10 and an associated speed change gearbox 12. The casing 14 of the gearbox 12 is fixed at its front end to the rear part of the cylinder block of the engine 10 and extends under the driver's position. The casing 14 has an elongate form in the longitudinal direction of the tractor. Secured to the rear end of the gearbox casing 14 is a back axle casing 15.

Figure 2:
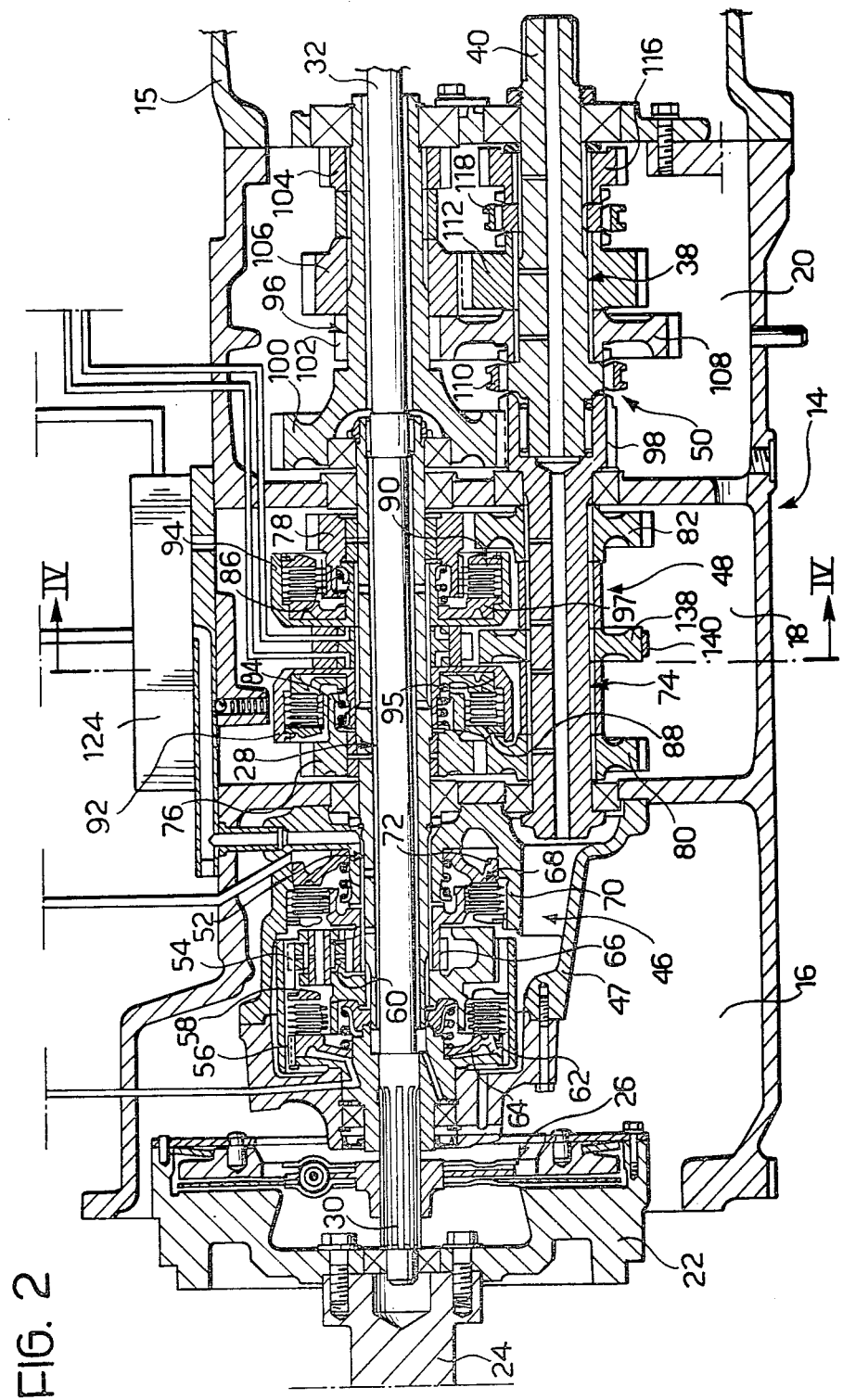
FIG. 2 is a longitudinal section of the gearbox.
Figure 3:
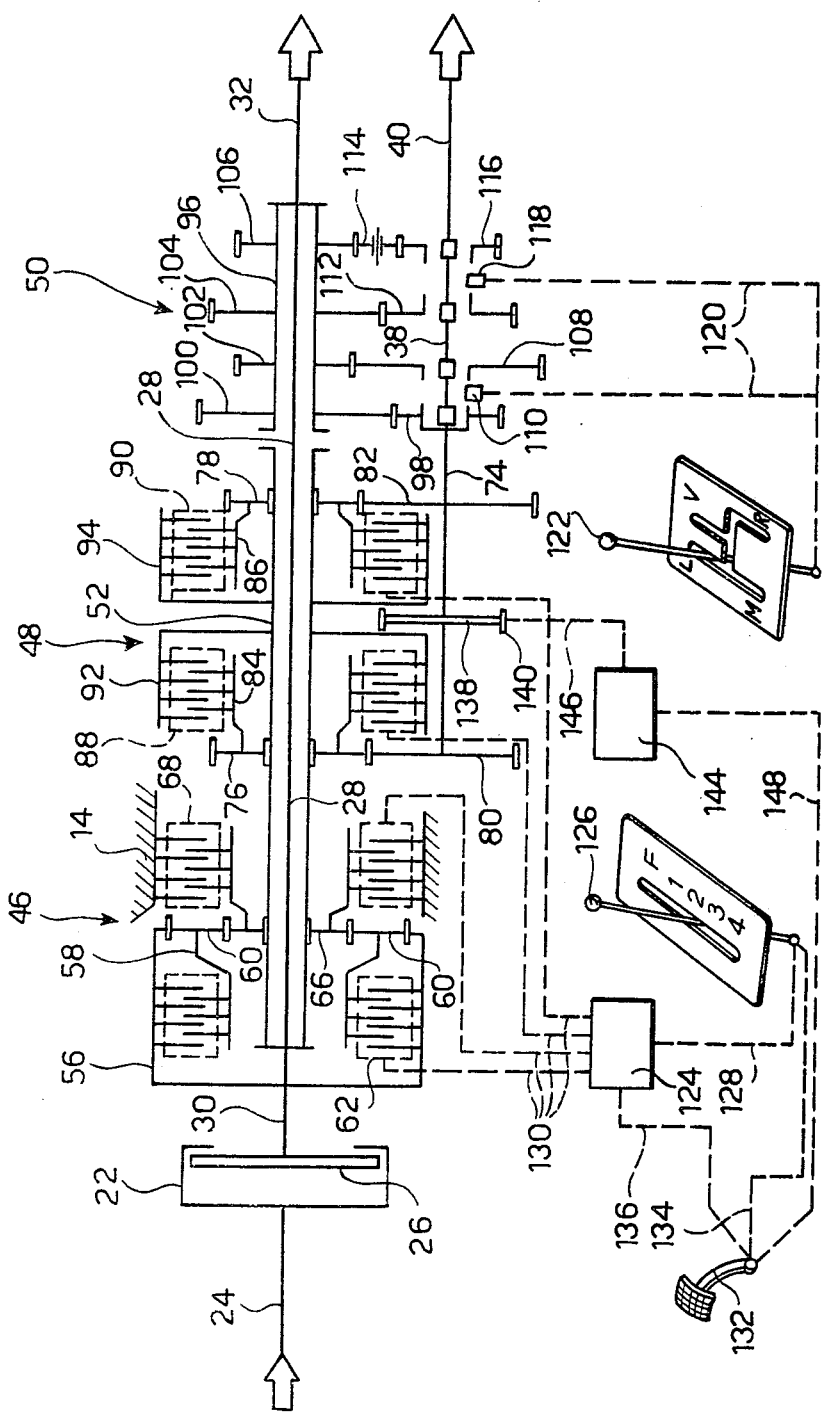
FIG. 3 is a schematic representation of the gearbox showing only the various hydraulic and mechanical controls.

Referring now to FIGS. 2 and 3, the gearbox casing 14 is of the type conventionally used for a mechanical gearbox and is internally sub-divided into three compartments 16, 18, 20 by transverse partitions. The compartment 16, which is that adjacent the engine, has the conventional bell-shape form and receives the fly wheel 22 fixed to the output end of the engine crankshaft 24.

In contrast to conventional mechanical gearboxes where the flywheel has an associated friction clutch also received in the compartment 16, in the gearbox illustrated, the flywheel 22 does not have an associated friction clutch, but instead carries the drive part of a disc-type flexible coupling joint, generally indicated 26. This flexible coupling joint 26 includes springs and is received in the compartment 16.

An input shaft 28 is rotatably mounted in the casing 14 and extends throughout the length of the casing 14. The front end portion 30 of the shaft 28 extends into the compartment 16 and is centred in the flywheel 22. The driven part of the joint 26 is keyed onto this shaft portion 30. The rear end portion 32 of the shaft 28 projects from the rear end of the casing 14 into the back axle casing 15 where it is connected to a first transmission shaft 34 (FIG. 1) which serves to drive a power take-off shaft 36 accessible from the rear of the tractor.

An output shaft 38 is also rotatably mounted in the gearbox casing 14 and extends parallel to the input shaft 32 below the latter in the rear compartment 20. The rear end portion 40 of the output shaft 38 projects from the casing 14 beneath the end portion 32 of the input shaft 28 and is connected, by means of a second transmission shaft 42, to a differential 44 contained in the back axle casing 15 and serving to transmit motion to the rear wheels of the tractor.

The input shaft 30 constitutes the drive shaft of a first reduction stage 46 arranged within a bell housing 47 contained in the compartment 16. The space occupied by the bell housing 47 in the compartment 16 is the space which, in a conventional gearbox casing, would be occupied by the friction clutch.

A second reduction stage 48 is arranged mechanically in series with the first reduction stage and is housed in the compartment 18 which, in a conventional mechanical gearbox, is occupied by the gears and by the other members of the ratio reduction gear unit including a mechanical clutch.

In the compartment 20 is housed a final reduction gear stage 50 which is of the conventional mechanical type provided with gears and serves for selection of a particular gearing ratio range (including a reverse range) for the gearbox as a whole (the particular gearing ratio set within a selected range being dependent on the gearing ratio set by the first and second reduction stages).

The first and the second reduction stages 46 and 48 have a common hollow transmission shaft 52 which coaxially surrounds the input shaft 28. This gear mechanism includes a crown wheel 54 which, by means of a cylindrical casing 56, is keyed on the front end portion 30 of the input shaft 28. The epicyclic gear mechanism also includes a planet carrier 58, which carries planets 60 and is keyed onto the hollow transmission shaft 52. The planet carrier 58 has a generally sleeve like form and is coaxially surrounded by the casing 56. The casing 56 constitutes the driving part of a multiple disc friction clutch 62 the driven part of which is constituted by the planet carrier 58.

The friction clutch 62 is of the hydraulically controlled type. The front part of the casing 56 functions as a hydraulic cylinder for an annular piston 64 operatively movable to effect clamping of the stack of discs of the clutch 62.

A toothed sun wheel 66 coaxially surrounds the hollow shaft 52 and meshes with the planets 60 which, in turn mesh with the crown wheel 54. The sun wheel 66 forms part of a sleeve which serves as the rotor part of a multiple disc friction brake 68. The stator part of the brake 68 includes a cylindrical casing 70 which forms part of the bell housing 47 and is therefore rigidly connected to the casing 14. The brake 68 is also of the hydraulically controlled type and the rear part of the casing 70 serves as the hydraulic cylinder for an annular piston 72 operatively movable to effect clamping of the stack of discs of the brake 68.

The portion of the hollow transmission shaft 52 arranged within the compartment 18 constitutes the drive shaft of the second reduction stage 48. The second stage comprises a driven shaft 74 which also serves as the drive shaft of the final stage 50. The shaft 74 is rotatably mounted in the casing 14 in alignment with the output shaft 38.

The two shafts 52 and 74 of the second reduction stage 48 carry two pairs of gears in continuous mesh. The driving gears 76 and 78 of these pairs, are freely rotatably mounted on the hollow shaft 52, whilst the two driven gears 80 and 82 are keyed on the shaft 74.

The two driving gears 76 and 78 have respective annular extensions 84 and 86 which constitute the driven parts of respective multiple disc friction clutches 88 and 90. The driving parts of these clutches are constituted by respective cylindrical casings 92 and 94 which are keyed on the hollow shaft 52. The two friction clutches 88 and 90 are of the hydraulically controlled type with parts of their respective casings 92, 94 serving as the hydraulic cylinder for respective annular pistons 95 and 97 operatively movable to effect clamping of the stack of discs of the corresponding clutches.

The final stage 50, which is of the conventional mechanical type, includes, as well as the drive shaft 74 and the output shaft 38 aligned therewith, an intermediate hollow shaft 96 which is rotatably mounted in the compartment 20 and coaxially surrounds the shaft 32.

The end of the drive shaft 74 which projects into the compartment 20 is formed with a driving sprocket 98 which is in continuous mesh with a driven wheel 100 formed at a corresponding end of the intermediate shaft 96. Three driving sprockets 102, 104 and 106 are keyed on the shaft 96. The sprocket 102 meshes with a gear wheel 108 freely rotatably mounted on the output shaft 38. A slidable clutch sleeve 110 permits the output shaft 38 to be selectively connected fast for rotation either with the drive shaft 74 by means of a dog clutch formed on the sprocket 98, or with the gear wheel 108 by means of a dog clutch formed on this latter.

The sprocket 104 is in continuous mesh with a driven gear wheel 112 which is also freely rotatably mounted on the output shaft 38. The sprocket 106 is connected, with the interposition of a reversing sprocket 114 ( shown in FIG. 3, but not visible in FIG. 2) with a driven gear wheel 116, freely rotatably mounted on the output shaft 38. A second clutch sleeve 118 permits the output shaft 38 to be selectively connected fast for rotation with either the gear wheel 112 or the gear wheel 116 by means of respective dog clutches formed on these gear wheels.

The movement of these clutch sleeves 110 and 118 is controlled by a lever 122 (FIGS. 2 and 3) located on the instrument panel of the tractor, and arranged to selectively move the clutch sleeves through lever systems of the usual type, schematically indicated by the broken lines 120 in FIG. 3.

As will be appreciated, the arrangement of the gears of the final stage 20 is such as to provide three ranges of forward gearing and one range of reverse gearing, the actual gearing ratio within each range being dependent on the current states of the first and second reduction stages 46 and 48. The first forward gearing range or low gear "L" is obtained with the sleeve 118 disengaged and the sleeve 110 coupling the shaft 38 to the gear wheel 108. In these conditions drive is transmitted through the final stage 50 by route 98-100-102-108-38.

The second forward gearing range or intermediate gear "M" is obtained with the sleeve 110 disengaged and the sleeve 118 displaced into engagement with the gear wheel 112. In these conditions the drive is transmitted through the final stage 50 by the route 98-100-104-112-38.

The third forward gearing range or high gear "V" is a direct drive obtained by coupling the shaft 38 to the sprocket 98 using the sleeve 110. In these conditions drive is transmitted directly from the shaft 74 to the shaft 38.

Finally, the reverse gearing range or reverse gear "R" is obtained by coupling the shaft 38 to the gear wheel 116 using the sleeve 118. In these conditions drive is transmitted through the final stage 50 by route 98-100-106-114-116-38.

The first and second stages 46, 48 are hydraulically controlled by means of a hydraulic distributor unit 124 (FIGS. 2 and 3). The unit 124 is advantageously mounted directly on the upper part of the casing 14, in the region of driver's position, and carries an operating lever 126. The lever 126 is arranged to control a distributor valve of the unit 124 in such manner as to selectively supply pressurised hydraulic fluid to the cylinders of the three friction clutches 62, 88, 90 and to the friction brake 68. The hydraulic fluid is fed under pressure to the distributor unit 124 from a suitable source, such as, for example, an open circuit hydrostatic control system of the tractor, this system being fed in its turn from a gear pump driven from the motor 10. Hydraulic equipment of this type is well known and will therefore not be described in detail.

When the clutch 62 is engaged and the brake 68 is disengaged, a gearing ratio of 1:1 is obtained between the input shaft 28 and the hollow shaft 52 of the first stage 46. A reduced ratio for example equal to 1:0.6794, is obtained when the clutch 62 is disengaged and the brake 68 is engaged.

The two pairs of gears of the second stage 48 permit two further reduction ratios to be selectively obtained, for example equal to 1:0.875 for the pair 78-82 and equal to 1:0.68 for the pair 76-80.

The distributor unit 124 is controllable by the lever 26 to combine the engagement and the disengagement of the three friction clutches and the friction brake in such a way as to obtain the following combinations, corresponding to four gear settings:

|  | Friction devices engaged |
| --- | --- |
| 1st gear | 68,90 |
| 2nd gear | 68,88 |
| 3rd gear | 62,90 |
| 4th gear | 62,88 |

Incorporated in the distributor unit 124 are two moderating valves of known type, which are interposed in the fluid supply circuits of the brake 68 and clutch 62 of the first stage 46 in order to effect, when the tractor is moving, a gradual change between the various gearing ratios provided by the two reduction stages 46 and 48, independently of the manner in which the driver has executed a gear change.

The mechanical connection between the lever 126 and the distributor unit 124 is shown by the broken line 128 in FIG. 3. The hydraulic connection between the distributor unit 124 and the friction clutches and the friction brake is indicated by broken lines 130.

The clutch pedal 132 (FIG. 3) of the tractor is used in conjunction with the lever 122 when changing the selected gearing range, this operation taking place with the tractor stationary. The clutch pedal 132 is mechanically connected to the control lever 126 (broken line 134). The mechanical connection 134 is of a known type which will cause the lever 126 to be moved to the position corresponding to the first gear whenever the pedal 132 is pressed. In this way, whatever the gearing range selected in the final stage 50 by means of the lever 122, the lowest gear of the range will be initially engaged.

By means of another mechanical connection, indicated by the broken line 136 in FIG. 3, the pedal 132 is also connected to a moderating valve (not shown) which is incorporated in the distributor unit 124. This moderating valve is arranged to effect a gradual and smooth operation of the friction brake 68 when first gear is engaged so that the tractor will move off gradually and smoothly, when the driver wishes.

Figure 4:
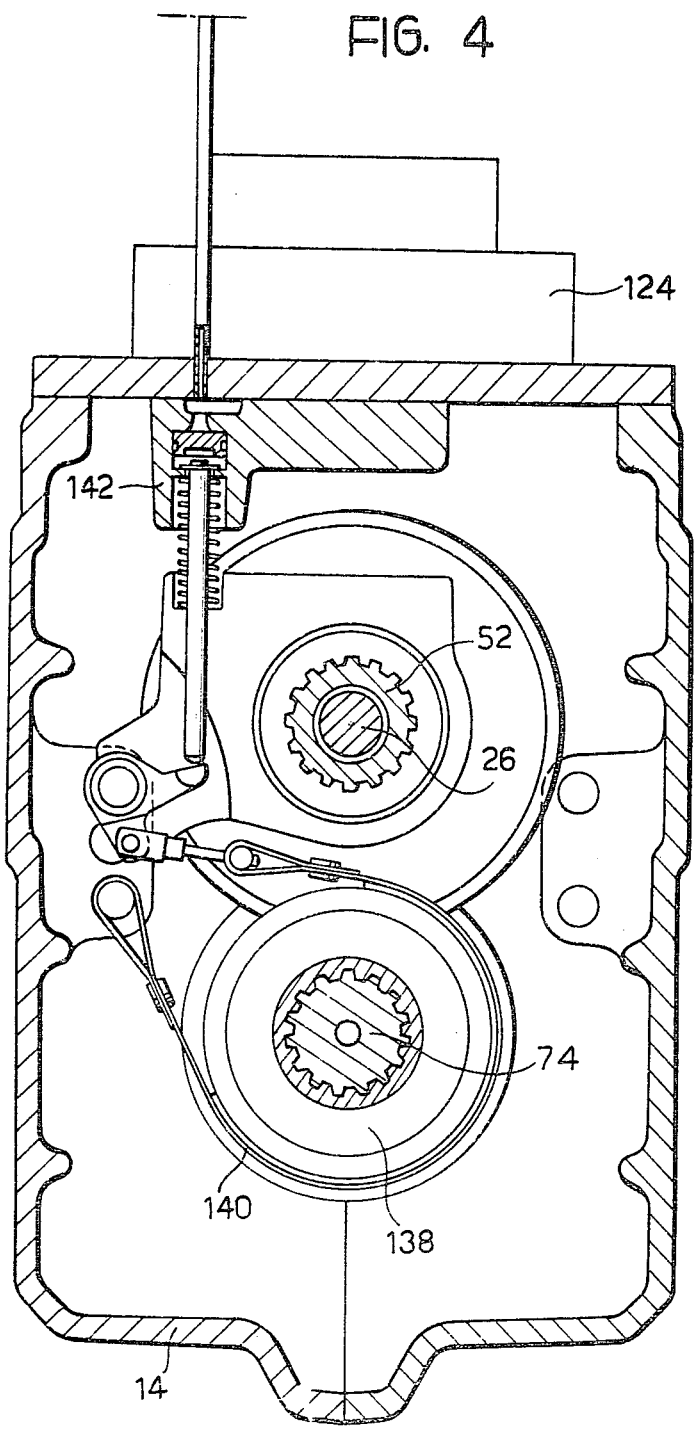
FIG. 4 is a section taken on line IV—IV of FIG. 2.

Oil - bath multiple disc friction brakes and clutches such as may used in the present gearbox tend to transmit a torque to the driven members even when these clutches and brakes are disengaged due to viscous drag effects. Thus, unless prevented, an unwanted transmission of drive to the shaft 74 could take place. Because the gears of the final stage 50 should be moved into engagement only when stationary static it is desirable to prevent rotation of the shaft 74 during a gear shift manoeuvre. To this end, a pulley or drum 138 (FIGS. 2, 3, and 4) of a band brake 140 is keyed on the shaft 74. The band brake 140, is controllable by means of a small hydraulic cylinder 142 (FIG. 4), which is selectively operable by a valve 144 communicating therewith through piping indicated in FIG. 3 by broken line. The valve 144 is connected to the clutch pedal 132 by a mechanical connection 148 of known type. This mechanical connection 148 is so arranged that, each time the pedal 132 is depressed, the band brake 140 is operated to lock the shaft 74 and thereby facilitate engagement of the final stage 50.

From the foregoing it can be seen that the gearbox illustrated and described has a form similar to wholly mechanical gearboxes used in similar applications (that is, elongate form with small transverse section). Furthermore due to the illustrated gearbox providing for four possible reduction ratios in its first and second stages and three ratios of forward gearing and one reverse ratio in its final stage, the gearbox can provide any one of twelve forward gearing ratios and four reverse ratios. If desired, another reduction unit can be provided for further increasing the total number of ratios possible.

I claim:
1. A speed change gearbox for agricultural tractors and similar vehicles, the gearbox comprising
   a casing of elongate form;
   an input shaft rotatably mounted in the casing and extending longitudinally therethrough to project from opposite ends of the casing, the projecting end portions of the input shaft respectively receiving drive from an engine of the vehicle and constituting a power take-off;
   an output shaft rotatably mounted in the casing parallel to the input shaft and projecting from the casing at the end corresponding to the power take-off;

reduction means housed in said casing and selectively operable to provide one of a plurality of reduction ratios between said input shaft and an output drive shaft of the reduction means, said reduction means comprising first and second mechanical reduction stage interconnected in series with each other by a hollow transmission shaft which surrounds said input shaft, the first stage being constituted by an epicyclic gear mechanism which coaxially surrounds the input shaft and the transmission shaft and includes a sun wheel a crown wheel fast for rotation with the input shaft a planet carrier fast for rotation with the transmission shaft, a hydraulically controlled friction clutch for selectively connecting said planet carrier with the input shaft, and a hydraulically controlled friction brake for selectively locking said sun wheel with respect to the casing, the second stage comprising driven gear wheels keyed on said drive shaft, driving gear wheels coaxially surrounding the transmission shaft and in continuous mesh with corresponding ones of said driven gear wheels, and hydraulically controlled friction clutches for selectively connecting each said driving gear wheel to the transmission shaft, each such clutch being disposed around said transmission shaft; and a final mechanical gear stage serving to establish a connection between the output drive shaft of the reduction means and the said output shaft of the gearbox, the final stage being selectively operable to set one of a plurality of forward gearing ratio ranges or at least one reverse gearing range with the actual reduction ratio through the gearbox in the selected range being dependent on the selected ratio of said reduction means.

2. A gearbox according to claim 1, wherein the friction clutches and the friction brake are of the multiple disc type.

3. A gearbox according to claim 1 or claim 2, wherein the output drive shaft of the reduction means has an associated band brake selectively operable to facilitate the operation of gearing range selection by holding the shaft stationary during said operation.

* * * * *